(12) United States Patent
Choi

(10) Patent No.: US 12,531,726 B2
(45) Date of Patent: Jan. 20, 2026

(54) SYSTEM FOR PROVIDING BLOCKCHAIN DID-BASED OPEN BADGE AND METHOD THEREOF

(71) Applicant: SWEMPIRE CO., LTD., Goyang-si (KR)

(72) Inventor: Myoung Soo Choi, Goyang-si (KR)

(73) Assignee: SWEMPIRE CO., LTD., Goyang-si (KR)

( * ) Notice: Subject to any disclaimer, the term of this patent is extended or adjusted under 35 U.S.C. 154(b) by 102 days.

(21) Appl. No.: 18/534,803

(22) Filed: Dec. 11, 2023

(65) Prior Publication Data

US 2024/0178997 A1 May 30, 2024

Related U.S. Application Data

(63) Continuation of application No. PCT/KR2023/018358, filed on Nov. 15, 2023.

(30) Foreign Application Priority Data

Nov. 30, 2022 (KR) .................. 10-2022-0164948

(51) Int. Cl.
*H04L 9/08* (2006.01)
*H04L 9/00* (2022.01)

(52) U.S. Cl.
CPC .............. *H04L 9/0866* (2013.01); *H04L 9/50* (2022.05)

(58) Field of Classification Search
CPC ....... H04L 9/0866; H04L 9/50; H04L 9/3239; H04L 9/3247
See application file for complete search history.

(56) References Cited

U.S. PATENT DOCUMENTS

| 11,093,933 B1* | 8/2021 | Peng ..................... H04L 9/3239 |
| 2021/0011905 A1* | 1/2021 | Uhr ....................... H04L 9/0637 |
| 2022/0173891 A1* | 6/2022 | Kim ..................... H04L 9/3247 |
| 2023/0185894 A1* | 6/2023 | Sorensen .............. H04L 9/3073 726/7 |

FOREIGN PATENT DOCUMENTS

KR 10-2226619 B1 3/2021

* cited by examiner

*Primary Examiner* — Mohammad W Reza
(74) *Attorney, Agent, or Firm* — Studebaker Brackett PLLC

(57) ABSTRACT

Disclosed is a system for providing an open badge, and a method thereof. The reliability of proof may be improved by using advantages of preventing forgery and alteration of data and guaranteeing integrity of data, by providing an open badge linked to a blockchain DID.

10 Claims, 8 Drawing Sheets

SYSTEM FOR PROVIDING BLOCKCHAIN DID-BASED OPEN BADGE AND METHOD THEREOF

CROSS-REFERENCE TO RELATED APPLICATIONS

The present application is a continuation of International Patent Application No. PCT/KR2023/018358, filed on Nov. 15, 2023 which is based upon and claims the benefit of priority to Korean Patent Application No. 10-2022-0164948 filed on Nov. 30, 2022. The disclosures of the above-listed applications are hereby incorporated by reference herein in their entirety.

BACKGROUND

Embodiments of the inventive concept described herein relate to a system for providing an open badge, and a method thereof, and more particularly, relate to a system for providing an open badge based on a blockchain DID, and a method thereof.

With the development of Internet services, most people use, through the Internet, numerous online services such as government institutions, educational institutions, medical institutions, telecommunication companies, financial companies, passenger companies, asset management, credit information, portals, social network services (SNS), games, shopping, ticketing, courier, electronic voting, etc.

Accordingly, users who intend to use these services need to sign up as members by entering personal information, including their real name, or to authenticate themselves as registered users by entering a specific ID and password. However, because it is quite cumbersome to repeat this authentication process at a plurality of sites, a method called simple authentication has been recently developed to easily conduct financial transactions on the Internet by logging in easily.

User authentication has been conventionally performed by using a centralized identify (ID) system. Generally, program Active X for using a public certificate or a separate application (App) for performing authentication has been installed, and then authentication has been performed through the program or application.

However, personal information may be leaked or abused in the centralized identity verifying system.

Moreover, when the user's identity is verified by using the program or application, a separate program needs to be installed. Besides, a new authentication application or a new authentication program may not be compatible with existing applications or programs, and thus the user identity may not be smoothly verified.

Nowadays, a decentralized identifiers (DID) technology, which allows users to verify their identity through a creation institution, is attracting attention.

In the meantime, an open badge is nowadays emerging as a new digital credentialing method using a blockchain technology. The open badge includes metadata of each individual's learning history, skills, knowledge, honor, experience, and capabilities in a unique image. The reliability of results may be improved by capturing and recognizing a wide range of learning results and verifying them by using a blockchain. In other words, the open badge is a standardized framework capable of sharing a badge, and has qualifications for evaluation, issuance security, and authentication system, thereby securing the reliability of proof.

Accordingly, there is a need to develop a technology capable of further improving the reliability of proof by using advantages of preventing forgery and alteration of data and guaranteeing integrity of data, by providing an open badge linked to a blockchain DID.

SUMMARY

Embodiments of the inventive concept provide a blockchain DID-based open badge providing system capable of further improving the reliability of proof by using advantages of preventing forgery and alteration of data and guaranteeing integrity of data, by providing an open badge linked to a blockchain DID, and a method thereof.

Problems to be solved by the inventive concept are not limited to the problems mentioned above, and other problems not mentioned will be clearly understood by those skilled in the art from the following description.

According to an embodiment, a blockchain DID-based open badge providing device includes a communication module that communicates with an external device, a storage module that stores at least one process for providing a blockchain DID-based open badge, and a processor that performs an operation for providing the blockchain DID-based open badge based on the at least one process. The processor may perform DID user registration on a blockchain at a request of a terminal of a recipient, may register the badge issuance data on the blockchain when badge issuance data regarding an open badge is received from a first institutional server that issues the open badge for the recipient, and may perform verification on the open badge when badge issuance data information about the open badge is received from a second institutional server in which the open badge is submitted or displayed.

According to an embodiment, a blockchain DID-based open badge providing method performed by a device includes performing DID user registration on a blockchain at a request of a terminal of a recipient, registering the badge issuance data on the blockchain when badge issuance data regarding an open badge is received from a first institutional server that issues the open badge for the recipient, and performing verification on the open badge when badge issuance data information about the open badge is received from a second institutional server in which the open badge is submitted or displayed.

Besides, a computer program stored in a computer-readable recording medium for implementing the inventive concept may be further provided.

In addition, a computer-readable recording medium for recording a computer program for implementing the inventive concept may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
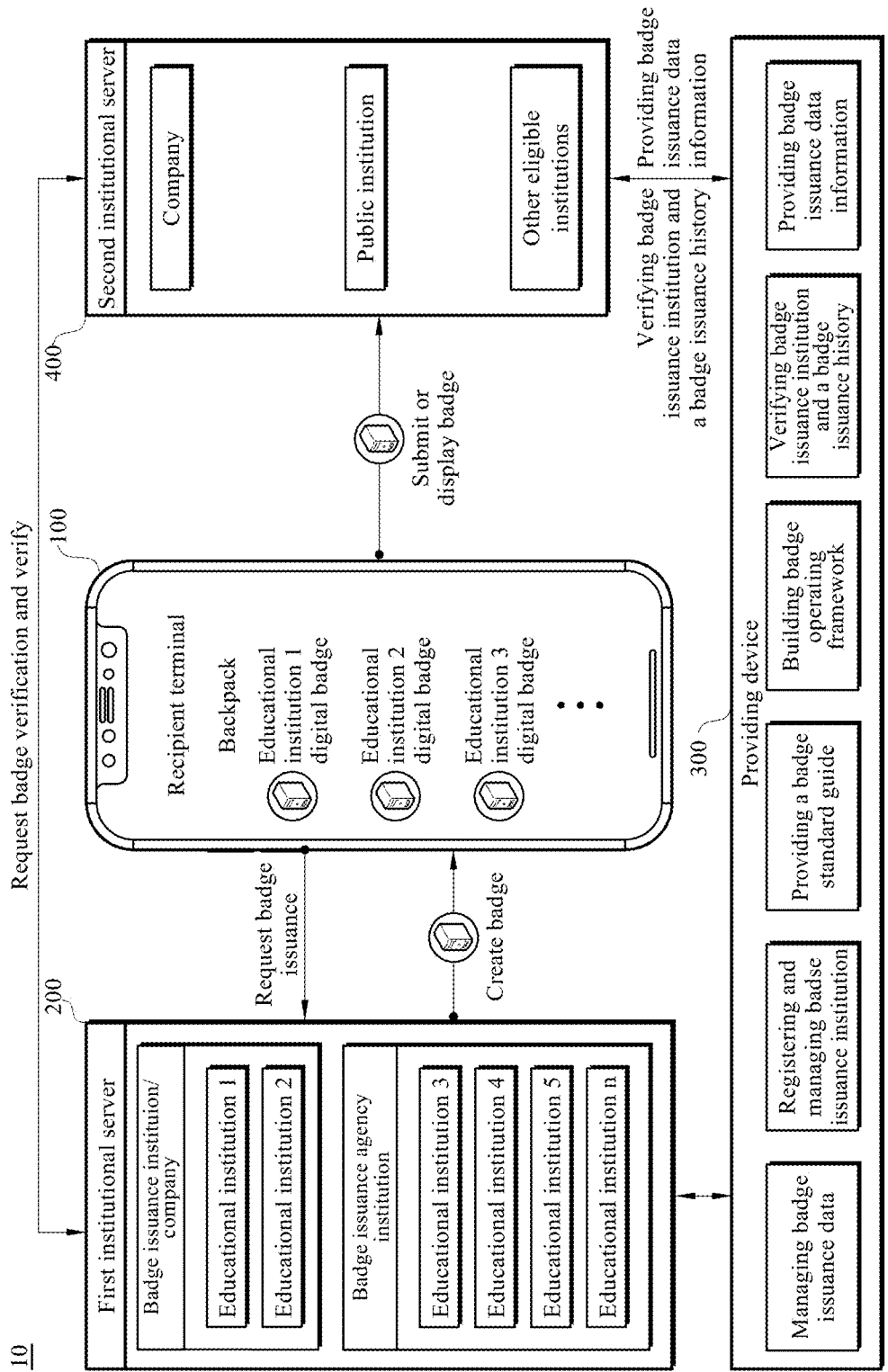
FIG. 1 is a diagram showing a network structure of a blockchain DID-based open badge providing system, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. The terms, such as those defined in commonly used dictionaries, should not be interpreted in an idealized or overly formal sense unless expressly so defined herein.

The same reference numerals denote the same elements throughout the inventive concept. The inventive concept does not describe all elements of embodiments. Well-known content or redundant content in which embodiments are the same as one another will be omitted in a technical field to which the inventive concept belongs. The term "unit" or "module" used herein may refer to software or hardware such as field programmable gate array (FPGA) or application specific integrated circuit (ASIC), and the "unit" or "module" may perform some functions. However, the "unit" or "module" may be not limited to software or hardware. The "unit" or "module" may be configured to exist in an addressable storage medium or may be configured to operate one or more processors. Therefore, as an example, "units" or "module" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" or "modules" and elements may be combined into a smaller number of "units" or "modules" and elements or may be divided into additional "units" or "modules" and elements.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, definitions of terms used in the description are as follows.

In the inventive concept, the description is limited to the providing device 300. However, the inventive concept may further include a server, a computer, and/or a portable terminal, or may be in a form of any one thereof.

Here, the server may be a server that processes information by communicating with an external device and may include an application server, a computing server, a database server, a file server, a game server, a mail server, a proxy server, and a web server.

For example, the computer may include a notebook computer, a desktop computer, a laptop computer, a tablet PC, a slate PC, and the like, which are equipped with a web browser.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, and a wearable device such as a timepiece, a ring, a bracelet, an anklet, a necklace, glasses, a contact lens, or a head-mounted device (HMD).

Hereinafter, operating principles and embodiments of the inventive concept will be described with reference to the accompanying drawings.

Figure 2:
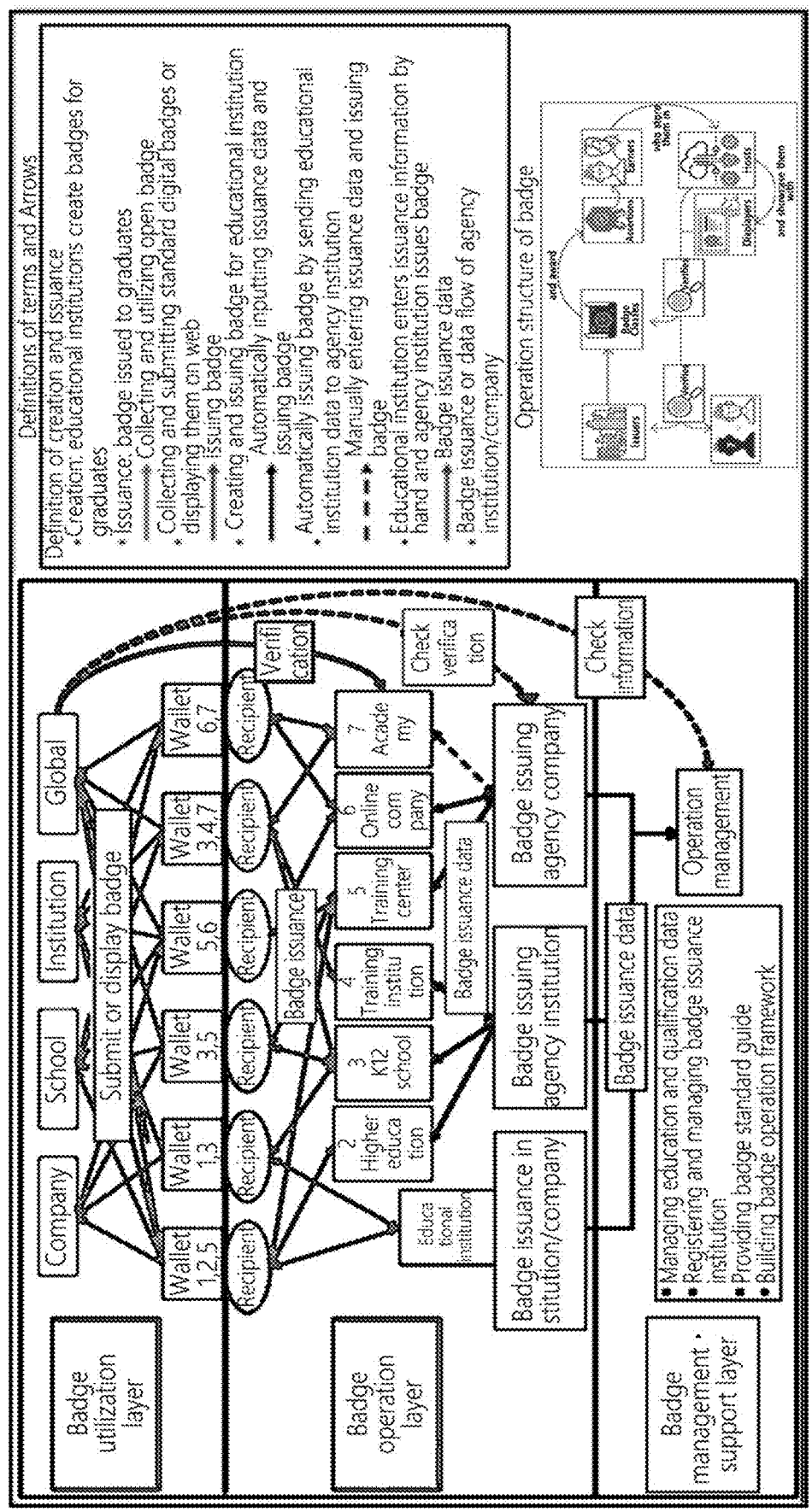
FIG. 2 is a diagram showing data flow in a blockchain DID-based open badge providing system, according to an embodiment of the inventive concept.

FIG. 1 is a diagram showing a network structure of a blockchain DID-based open badge providing system, according to an embodiment of the inventive concept. FIG. 2 is a diagram showing data flow in a blockchain DID-based open badge providing system, according to an embodiment of the inventive concept.

Referring to FIGS. 1 and 2, a blockchain DID-based open badge providing system 10 (hereinafter referred to as a 'providing system') according to an embodiment of the inventive concept may include a recipient terminal 100, a first institutional server 200, an open badge providing device 300 (hereinafter referred to as a 'providing device'), and a second institutional server 400.

The recipient terminal 100 is a terminal of a recipient (a training target) who performs provided by a first institution, and performs DID user registration through the providing device 300 to use a blockchain DID-based open badge providing service. In this case, when the DID user registration is performed, user identity may be verified through integrated authentication (biometric authentication, a PIN number, or a pattern) while the first distributed ID is issued.

In the meantime, after a recipient using the recipient terminal 100 performs learning, the recipient requests the first institutional server 200 to issue an open badge including an assertion including information about the performance as the result of the learning. When an open badge is created in response to the request, the recipient submits or displays the badge to the second institutional server 400.

The first institutional server 200 may be a server of an educational institution or an agency institution.

In an embodiment, in the case where the first institutional server 200 is a server of an educational institution, when an open badge is created and issued to a recipient who has completed learning through the educational institution, the first institutional server 200 sends educational institution data to the agency institution and automatically issues and provides an open badge.

In another embodiment, when the first institutional server 200 is a server of an agency institution, the first institutional server 200 receives badge creation data (educational institution data) for a recipient from the educational institution, and issues and provides an open badge to the recipient.

In detail, when issuing an open badge, the first institutional server 200 issues an open badge by identifying (measuring) at least one of the recipient's learning chunks, proficiency, competency, and talent. In this case, the first institutional server 200 may determine whether the recipient satisfies requirements necessary to obtain an open badge, based on pre-stored criteria. When the requirements are satisfied, the first institutional server 200 may issue an open badge, and may transmit badge issuance data to the providing device 300 such that the providing device 300 registers and manages the badge issuance data on a blockchain In the meantime, after creating an open badge, the first institutional server 200 may transmit the badge issuance data to the providing device 300 so as to be registered and managed. An issuer (i.e., the first institutional server 200) uses a public key to sign the assertion. Afterward, the public key is used for verification.

In addition, the first institutional server 200 may cancel the open badge. In this case, the required method of canceling an open badge differs based on whether the assertion is a hosted assertion or a signed assertion.

Moreover, to use the blockchain DID-based open badge providing service, the first institutional server 200 performs the DID user registration by registering its own (creator) distributed ID information in the trusted ID storage (i.e., a blockchain) through the providing device 300.

When the badge issuance data is received from the first institutional server 200, the providing device 300 registers and manages the badge issuance data.

In particular, metadata regarding badges, recipients, and issuers may be identified by using one of two verification methods. The identifying of the hosted assertions may involve a task of calling a stable URI of the assertion and BadgeClass, determining whether the corresponding URI is present, and determining whether a domain origin is matched or access is allowed.

The providing device 300 may perform an operation of managing badge issuance data, an operation of registering and managing a badge issuance institution, an operation of providing a badge standard guide, an operation of building a badge operating framework, an operation of verifying a badge issuance institution and a badge issuance history, and an operation of providing badge issuance data information.

The providing device 300 stores and searches for smart contract-based blockchain data for open badges. In this case, data search performance may be improved by generating actual data blocks into one file by using a data block allocation table linked to a data registration transaction, and caching data meta information and the data block allocation table. Furthermore, the data search performance may be improved by generating actual data blocks into one file by using a data block allocation table linked to a data registration transaction, and caching data meta information and the data block allocation table. To this end, data may be encrypted based on unique information generated by smart contracts, and the encrypted data may be applied such that a decryption key is automatically obtained depending on access control permissions.

In the meantime, the second institutional server 400 may be a consumer's device (terminal). When the open badge is submitted or displayed from the recipient terminal 100, the second institutional server 400 may request the first institutional server 200 to verify an assertion, which is digitally signed in the open badge, based on the public key such that the verification is performed. Besides, when the open badge is completely verified, the second institutional server 400 may transmit badge issuance data information through the providing device 300 to verify badge issuance institution and badge issuance history.

Figure 3:
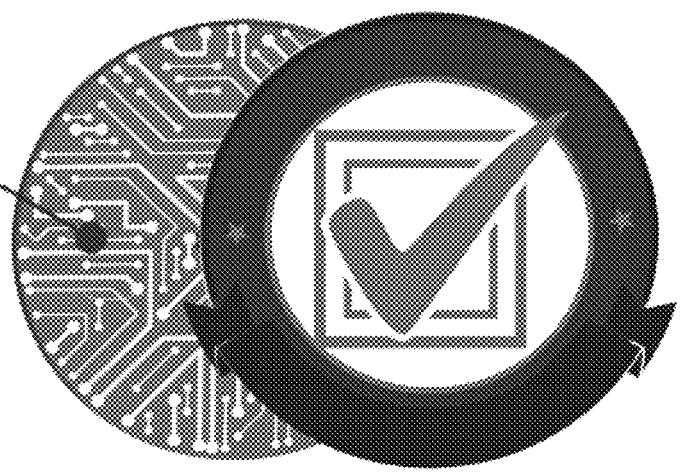
FIG. 3 is a diagram for describing a concept of an open badge, according to an embodiment of the inventive concept.

FIG. 3 is a diagram for describing a concept of an open badge, according to an embodiment of the inventive concept.

An open badge may be issued, obtained, and managed through an open badge platform that supports an open badge standard. As shown in FIG. 3, the open badge includes information about content of guaranteed skills, issuer information, recipient information thus obtained and displayed, expiration date, a method for verification, or the like. The open badge may also be approached from an ecological perspective. Major stakeholders may be classified into three types: an institution that issues a badge, a recipient that obtains the badge, and a company that develops an open badge platform.

First of all, the institution that issues the open badges may be usually an educational institution. The educational institution may divide learning into small chunks to provide the small chunks to a recipient, may recognize the learning based on proficiency, may issue an open badge by recognizing microcredentials, and may measure and maintain the talent of the recipient.

Also, the recipient who obtains the open badge may submit the open badge as evidence of the skills or academic achievements that he/she has learned, to go on to an advanced school or to find a job, may collect the open badge in a portfolio or backpack to provide a notification of his/her story, and may share his/her open badge with social media or the community.

Moreover, the company that finds business opportunities may design a system capable of recognizing and verifying small chunks of learning provided by educational institutions, may develop a tool for tracking recipient engagement levels, extending resources, creating an open badge, and displaying/hosting the open badge, may apply an open badge standard, and may obtain conformity certification.

Figure 4:
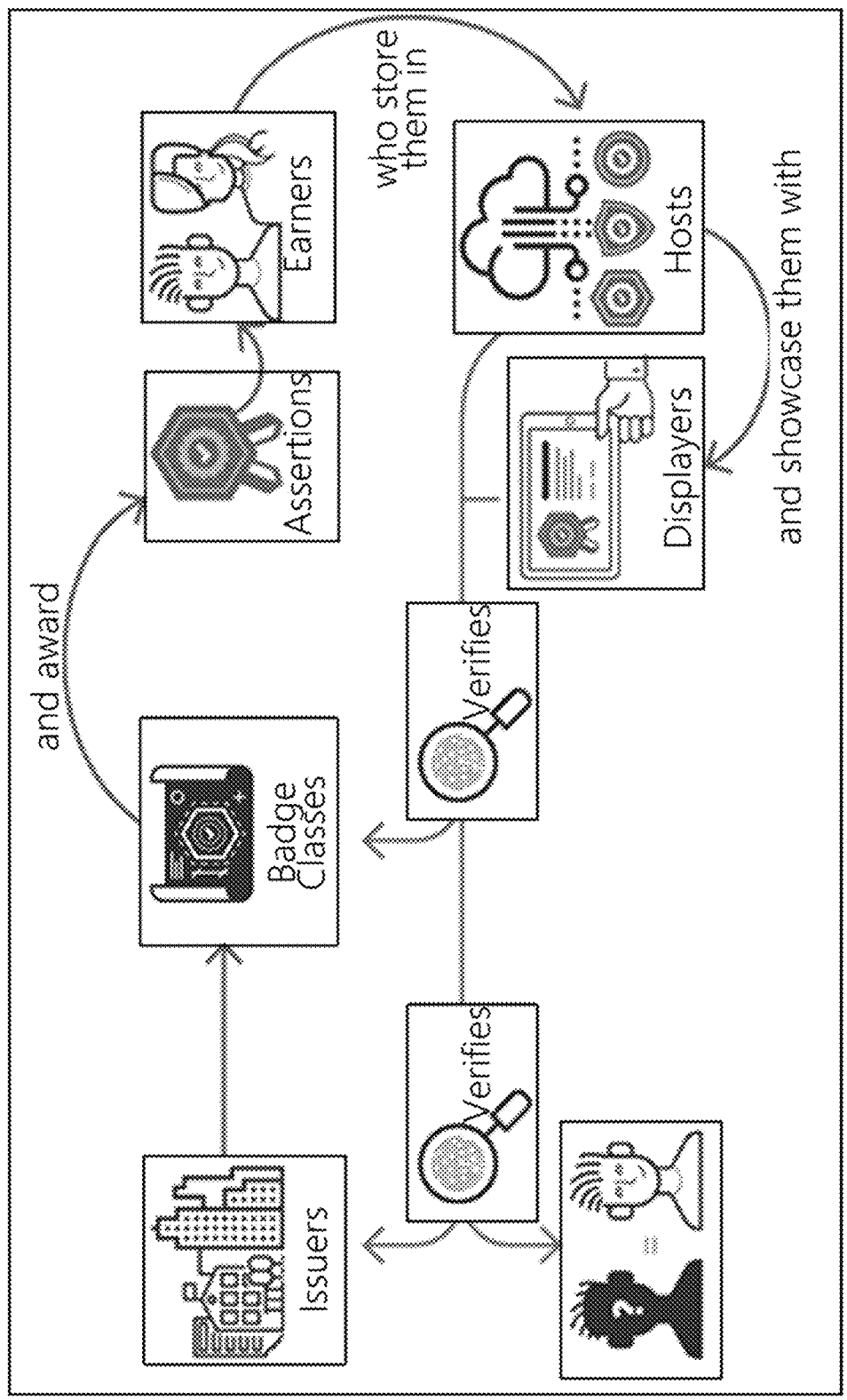
FIG. 4 is a diagram showing a flow of digital authentication using a blockchain DID-based open badge, according to an embodiment of the inventive concept.

FIG. 4 is a diagram showing a flow of digital authentication using a blockchain DID-based open badge, according to an embodiment of the inventive concept.

To create an open badge, resources need to be interconnected and displayed according to the structure and guidelines specified in an open badge standard. One open badge (sometimes referred to as a "badge instance") may be a set consisting of an issuer, BadgeClass, and assertion, and the issuer and BadgeClass may be shared between a plurality of badge instances. When each resource is generated, the assertion may be baked into a badge image, and the badge may be delivered to a recipient. The "baked badge" is a unique characteristic of an open badge that allows a person receiving the baked badge to move the badge from one platform (an issuance system) to another platform (e.g., a passport or backpack tool). Three main concepts related to badge issuance are summarized in more detail as follows.

An issuer profile is a description of individuals or institutions awarding a badge. Information about a profile may be expressed as metadata of a badge including at least one of a name, a description, a contact email address, and a website URI. Each profile illustrating an issuer may be referenced by a lot of BadgeClasses that the issuer defines. Anyone may start issuing an open badge by creating and hosting an issuer file. The issuer may often act as the recipient of an open badge included in an assertion by using a specific attribute of the profile, such as a URL or a contact's email address. The issuer profile is a subclass of a general profile with some additional requirements.

The BadgeClass may be a description of details that the badge issuer defines as a unit of achievement. The BadgeClass may include information such as a name, a description, and information about a graphic image that is the visual face of the badge, and may also include information about a method of obtaining a badge, detailed criteria, and a link to the issuer profile that created the badge. This needs to be displayed as a stable URL that may display a web page providing human-readable basic information and an image file visually symbolizing achievements. Many assertions may be created from a single BadgeClass.

The assertion may indicate an individual's badge achievement record. The assertion may be connected to the BadgeClass and may include specific information related to a recipient who receives the badge. For example, the assertion may include at least one of the following: an issued date, an encoded identifier of a recipient of the badge, and a link to the certification and expiration date as optional information.

Referring to FIG. 4, the following three points may be found in terms of roles in the open badge ecosystem.

An issuer indicates an application that creates a BadgeClass in compliance with the open badge standard and issues an assertion to a recipient who obtains the badge. A displayer indicates an application that displays an open badge together with related metadata and also provides a check function. Hosts indicates applications that are capable of importing, aggregating, and publicly hosting an open badge while supporting badge export at a request of a person who obtains a badge.

Figure 5:
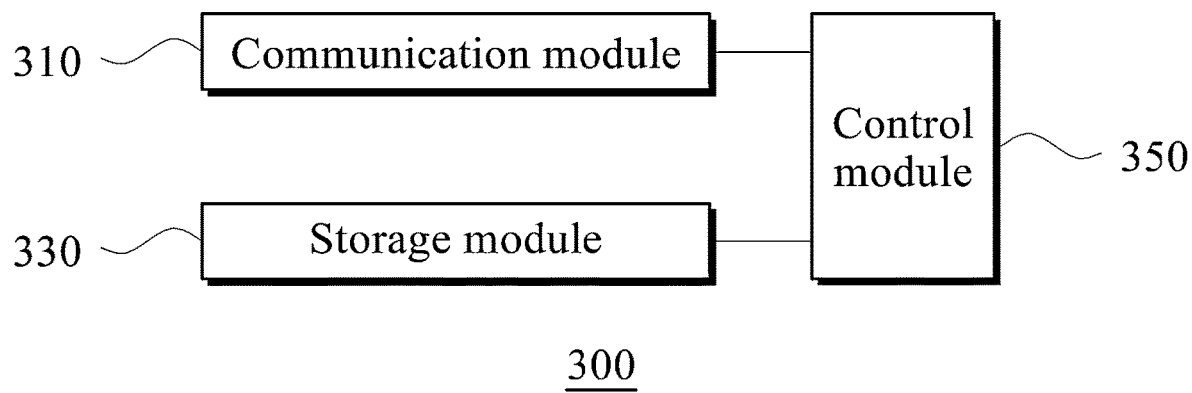
FIG. 5 is a diagram showing a configuration of a blockchain DID-based open badge providing device, according to an embodiment of the inventive concept.

FIG. 5 is a diagram showing a configuration of a blockchain DID-based open badge providing device, according to an embodiment of the inventive concept.

Referring to FIG. 5, the blockchain DID-based open badge providing device 300 according to an embodiment of the inventive concept may include a communication module 310, a storage module 320, and a control module 330.

The communication module 310 may performs wired or wireless communication with the recipient terminal 100, the first institutional server 200, the second institutional server 400, and at least one external device (a server, etc.). In particular, when wireless communication is performed, wireless signals are exchanged over a communication network based on wireless Internet technologies.

The communication module 310 may include one or more components that enable communication with an external device. The communication module 310 may include, for example, at least one of a wired communication module, a wireless communication module, and a short-range communication module, and may transmit and receive signals based on the at least one communication module.

Here, in addition to various wired communication modules such as a Local Area Network (LAN) module, a Wide Area Network (WAN) module, or a Value Added Network (VAN) module, the wired communication module may include a variety of cable communication modules such as Universal Serial Bus (USB), High Definition Multimedia Interface (HDMI), Digital Visual Interface (DVI), recommended standard (RS-232), power line communication, or plain old telephone service (POTS).

In addition to a Wifi module and a Wireless broadband (WiBro) module, the wireless communication module may include a wireless communication module that supports various wireless communication methods such as global System for Mobile Communication (GSM), Code Division Multiple Access (CDMA), Wideband Code Division Multiple Access (WCDMA), universal mobile telecommunications system (UMTS), Time Division Multiple Access (TDMA), Wireless LAN (WLAN), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), 4G, 5G, 6G, or the like.

The short-range communication may be used for short range communication, and may support short-range communication by using at least one of Bluetooth™, radio frequency identification (RFID), infrared data association (IrDA), ultra wideband (UWB), ZigBee, near field communication (NFC), Wireless-Fidelity (Wi-Fi), Wi-Fi Direct, and wireless universal serial bus (Wireless USB) technologies.

In detail, the communication module 310 receives badge issuance data from the first institutional server 200 based on wired or wireless communication, and receives badge issuance data information from the second institutional server 400. In addition, the communication module 310 exchanges various types of information with at least one external device.

The storage module 320 stores data and/or various types of information for supporting various functions of the providing device 300. The storage module 320 may store a plurality of application programs (or applications) running in the providing device 300, data for an operation of the providing device 300, and instructions. At least part of the application programs may be downloaded from an external server through wireless communication. In the meantime, the application program may be stored in at least one memory provided in the storage module 320, may be installed in the providing device 300, and may be driven so as to perform an operation (or function) executed by at least one processor provided in the control module 330.

In the meantime, the at least one memory may include a storage medium of at least one type of a flash memory type, a hard disk type, a multimedia card micro type, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. Besides, the memory may store information temporarily, permanently, or semi-permanently, and may be provided in an embedded type or a removable type.

The storage module 320 may establish and store a database for providing a blockchain DID-based open badge providing service. The database may store various pieces of information about at least one respective user (a recipient, an educational institution, a receiving institution, or the like) subscribed to the open badge providing service. Moreover, the storage module 320 may store at least one process for providing the blockchain DID-based open badge providing service.

The control module 330 may include at least one processor for providing the blockchain DID-based open badge providing service. The control module 330 may allow all components within the providing device 300 to process signals, data, information, or the like, which is input or output, or may perform various processes by executing commands, algorithms, and application programs stored in at least one memory.

That is, all operations performed by the providing device 300 described above based on FIGS. 1 and 2 may be performed under control of the control module 330.

In detail, when a DID user registration request is received from the recipient terminal 100, the control module 330 completes registration on a blockchain by verifying user identity through integrated authentication (biometric authentication, PIN number, and patterns) while issuing a first distributed ID. In the meantime, when badge issuance data for a recipient's open badge is received from the first institutional server 200, the control module 330 registers and manages the badge issuance data on the blockchain. When badge issuance data information is received from the second institutional server 400, the control module 330 identifies a badge issuance institution and a badge issuance history by using the badge issuance data information such that verification is completed.

Figure 6:
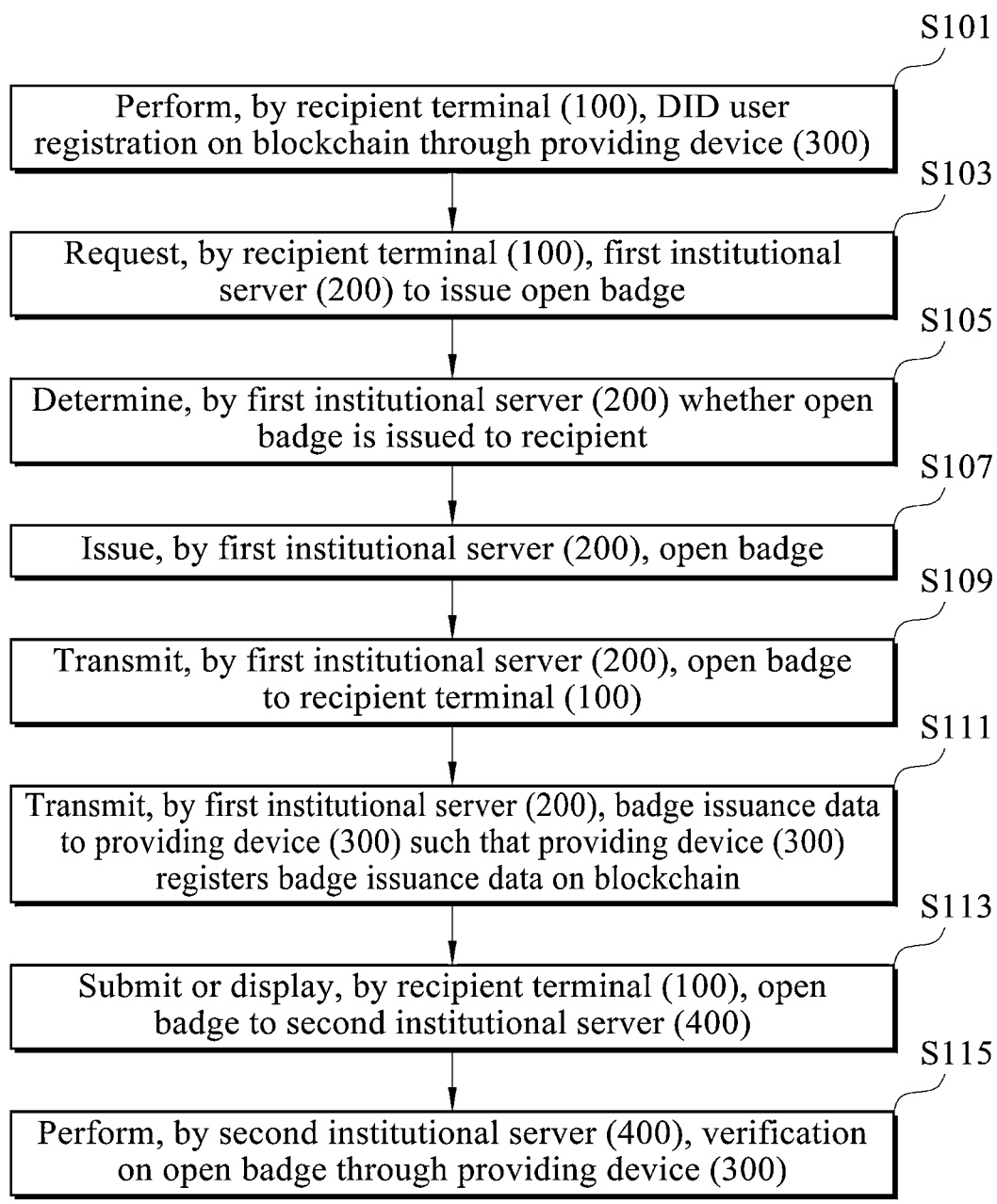
FIG. 6 is a flowchart showing a method of providing a blockchain DID-based open badge, according to an embodiment of the inventive concept.

FIG. 6 is a flowchart showing a method of providing a blockchain DID-based open badge, according to an embodiment of the inventive concept.

Referring to FIG. 6, a recipient performs a DID user registration on a blockchain through the providing device 300 by using the recipient terminal 100 to use blockchain DID-based open badge providing service (S101). Afterward, the recipient terminal 100 selects the issuance item and requests the first institutional server 200 to issue an open badge (S103).

In response to the request, the first institutional server 200 determines whether the recipient satisfies requirements for receiving the open badge (i.e. whether the issuance is possible), based on the previously stored criteria (S105). When the requirements are satisfied, the first institutional server 200 issues the open badge (S107).

Next, the first institutional server 200 transmits the open badge to the recipient terminal 100 (S109). The first institutional server 200 transmits badge issuance data for the open badge to the providing device 300 such that the providing device 300 registers the badge issuance data for the corresponding recipient on the blockchain (S111).

Next, when the recipient terminal 100 submits or displays the open badge received in step S109 to the second institutional server 400 (S113), the second institutional server 400 transmits badge issuance data information about the open badge to the providing device 300 such that verification is performs (S115).

Figure 7:
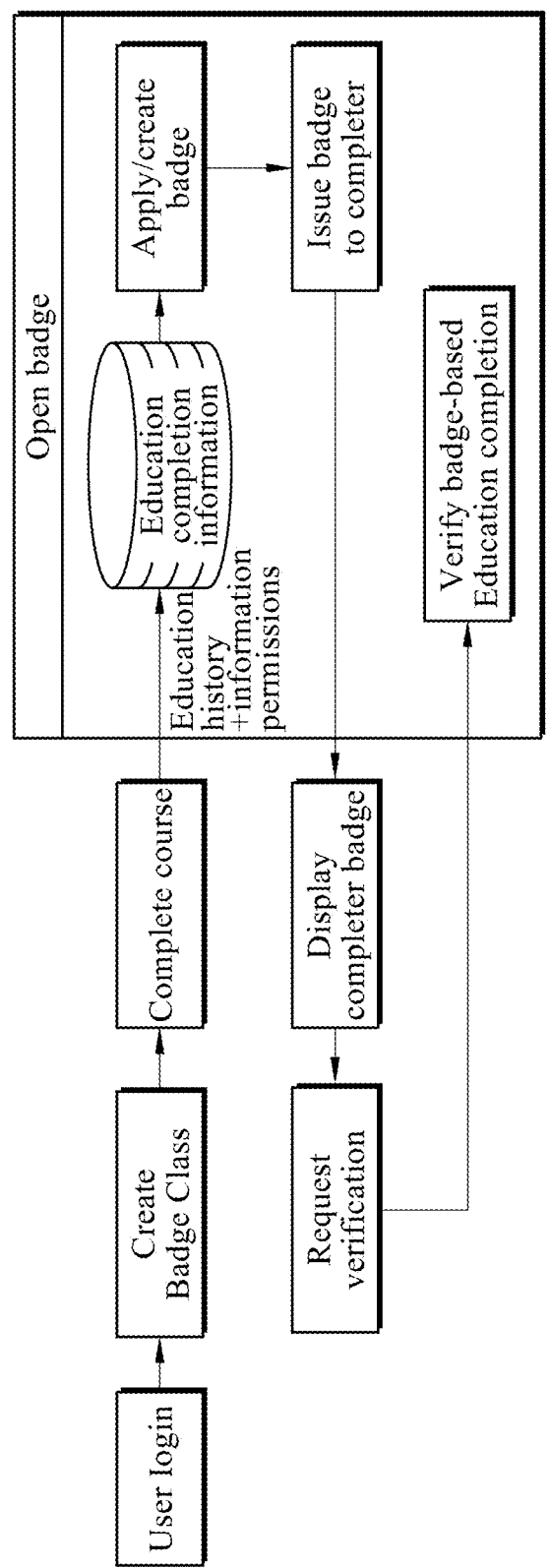
FIG. 7 is a diagram showing an example of utilizing a blockchain DID-based open badge, according to an embodiment of the inventive concept.

FIG. 7 is a diagram showing an example of utilizing a blockchain DID-based open badge, according to an embodiment of the inventive concept.

Because an open badge provides the following powerful features that differentiate the open badge from other types of digital badges, the open badge is being widely adopted in an education sector.

For example, lectures may be created at schools or institutions and then badges may be obtained under conditions. A recipient (learner) may attend a lecture and then may obtain a badge. The obtained badge may be collected and managed to provide a learning profile (e-portfolio) service.

Figure 8:
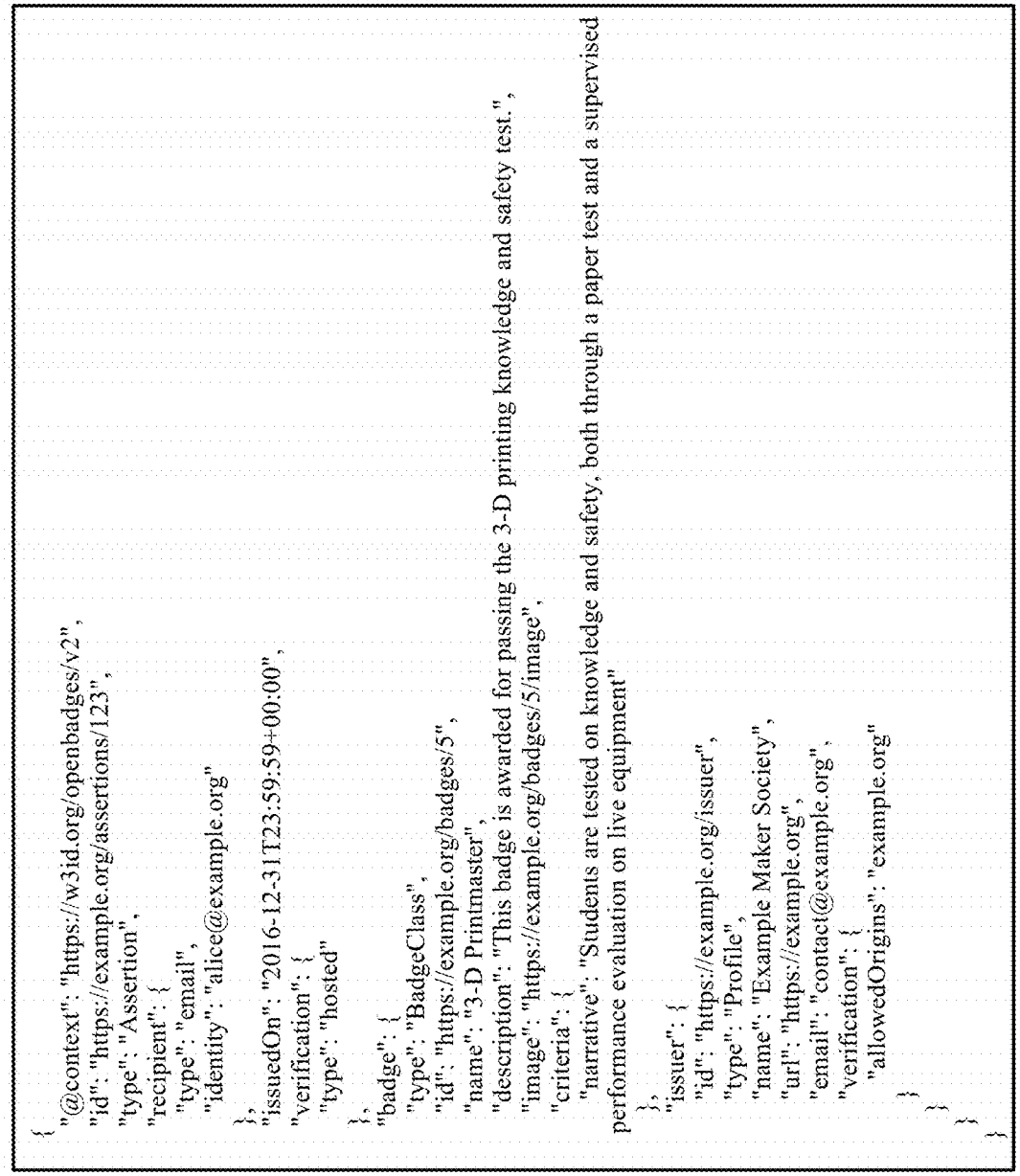
FIG. 8 is a diagram showing an example of data included in a blockchain DID-based open badge, according to an embodiment of the inventive concept.

FIG. 8 is a diagram showing an example of data included in a blockchain DID-based open badge, according to an embodiment of the inventive concept.

An open badge may be issued based on IMS global open badge international standard 2.0. This specification refers to a method of packaging information about performance, including the packaged information in a portable image file as an open badge, and setting up resources for verification.

Referring to FIG. 8, the open badge may include meta data about achievements.

The open badge is expressed in JSON-LD In a method of displaying data to improve understanding in a variety of contexts, and may include documents other than purposes contemplated herein. The open badge may utilize functions of JSON-LD for internationalization/localization, entity identification with unique IRI, and extensibility.

In the meantime, the open badge is used by thousands of issuers around the world. A user of the corresponding badge may issue internationalized and multilingual badges by using various languages.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to the above-mentioned problem solving means of the inventive concept, the reliability of proof may be improved by using advantages of preventing forgery and alteration of data and guaranteeing integrity of data, by providing an open badge linked to a blockchain DID.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A blockchain decentralized identifier (DID)-based open badge providing device, the open badge providing device comprising:
   a communication module configured to communicate with an external device;
   a storage module configured to store at least one process for providing the blockchain DID-based open badge, wherein the blockchain DID-based open badge includes information about content of guaranteed skills, issuer information, recipient information, expiration date, and a method for verification; and
   a processor configured to perform an operation for providing the blockchain DID-based open badge based on the at least one process,
   wherein the processor is configured to:
   perform DID user registration on a blockchain at a request of a terminal of a recipient of the blockchain DID-based;
   when badge issuance data of the blockchain DID-based open badge is received from a first institutional server that issues the blockchain DID-based open badge for the recipient, register the badge issuance data on the blockchain; and
   when the badge issuance data of the blockchain DID-based open badge is received from a second institutional server that receives the blockchain DID-based open badge issued by the first institutional server or displays the blockchain DID-based open badge issued by the first institutional server, perform verification on the blockchain DID-based open badge.

2. The blockchain DID-based open badge providing device of claim 1, wherein the blockchain DID-based open badge is requested to be issued as an issuance item is selected by the terminal of the recipient, and then is issued.

3. The blockchain DID-based open badge providing device of claim 2, wherein whether the blockchain DID-based open badge is issued is determined by the first institutional server by determining whether the recipient satisfies requirements necessary to obtain the blockchain DID-based open badge, based on pre-stored criteria.

4. The blockchain DID-based open badge providing device of claim 3, wherein the blockchain DID-based open badge is issued by identifying or measuring at least one of learning chunks, proficiency, competency, and talent of the recipient.

5. The blockchain DID-based open badge providing device of claim 4, wherein the blockchain DID-based open badge includes the issuer information, BadgeClass information, and assertion information, and
   wherein the assertion information includes information about a learning outcome as a result of learning performed by the recipient.

6. The blockchain DID-based open badge providing device of claim 5, wherein the processor is configured to:
   when registering the badge issuance data on the blockchain, call Uniform Resource Identifier (URI) corresponding to the BadgeClass information and the assertion information;
   determine whether the URI is present; and
   determine whether a domain source is matched or access is allowed.

7. The blockchain DID-based open badge providing device of claim 1, wherein the processor is further configured to perform the verification on the blockchain DID-based open badge based on a public key used to sign an assertion that is digitally signed in the blockchain DID-based open badge.

8. The blockchain DID-based open badge providing device of claim 1, wherein the processor is further configured to:
   when performing the DID user registration, verify user identity through integrated authentication while issuing a first distributed identification (ID).

9. The blockchain DID-based open badge providing device of claim 8, wherein the integrated authentication includes at least one of biometric authentication, a Personal Identification Number (PIN), and a pattern.

10. A blockchain decentralized identifier (DID)-based open badge providing method performed by a device, the method comprising:
  performing DID user registration on a blockchain at a request of a terminal of a recipient of the blockchain DID-based, wherein the blockchain DID-based open badge includes information about content of guaranteed skills, issuer information, recipient information, expiration date, and a method for verification;
  when badge issuance data of the blockchain DID-based open badge is received from a first institutional server that issues the blockchain DID-based open badge for the recipient, registering the badge issuance data on the blockchain; and
  when the badge issuance data of the blockchain DID-based open badge is received from a second institutional server that receives the blockchain DID-based open badge issued by the first institutional server or displays the blockchain DID-based open badge issued by the first institutional server, performing verification on the blockchain DID-based open badge.

* * * * *